United States Patent Office 3,751,464
Patented Aug. 7, 1973

3,751,464
N-SUBSTITUTED-N'-CYCLOALKYL-NITROBENZAMIDES
William D. Roll, Toledo, Ohio, assignor to The University of Toledo, Toledo, Ohio
No Drawing. Filed Apr. 26, 1971, Ser. No. 137,674
Int. Cl. C07c 103/30
U.S. Cl. 360—558 R        9 Claims

ABSTRACT OF THE DISCLOSURE

Simultaneously acting central nervous system (CNS) depressants and blood pressure depressors of the formula

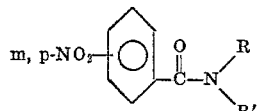

wherein R is selected from the group consisting of alkyl, hydroxyalkyl, cyanoalkyl, aryl, aralkyl, and hydroxyaralkyl radicals; and wherein R' is selected from the group consisting of cycloaliphatic radicals containing between three and seven carbon atoms.

BACKGROUND OF THE INVENTION

Although similar N,N'-substituted-nitrobenzamides are known, none were found which had any CNS depressant or blood pressure depressor effects as applicant's new compounds. For example; the Walde U.S. Pat. No. 3,015,606 patented Jan. 2, 1962, Welch et al. U.S. Pat. No. 3,518,305 patented June 30, 1970, and British Pat. No. 866,516 are for anti-protozoan activity; and Soloway et al. U.S. Pat. No. 3,530,181 patented Sept. 22, 1970 is for a herbicide.

SUMMARY OF THE INVENTION

(A) The compounds

The new compounds of this invention have central nervous system depressant activity in small animals such as rats and mice, and in dosages of 5 milligrams per kilogram of the animal, they also produce a drop in blood pressure in these animals.

These new compounds have the general formula:

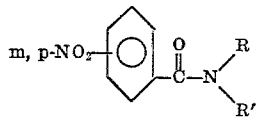

wherein R may comprise methyl-, ethyl-, propyl-, isopropyl-, hydroxymethyl-, 2-hydroxyethyl-, 2-cyanoethyl-, phenyl-, 2-phenethyl-, 2-hydroxyphenethyl-, and R' may comprise a tri-, quatra-, penta-, hexa-, or hepta-cycloaliphatic radical, preferably the cyclohexyl radical, which together with the nitro-radical on the phenyl ring of the benzamide confers the proper physicochemical properties on these compounds which are necessary for maximal activity in the animals tested. Although the para-nitro-substituted compounds are preferred, the meta-nitro-substituted compounds also are good. The N— small alkyl ($C_1$ to $C_3$) substituted compounds showed the most significant depressant and blood pressure depressor action in any practical dosages. From this generic group of compounds there may be divided several sub-groups, such as the para-nitro benzamides which showed the most reduction in spontaneous activity in mice, namely, those having the methyl, ethyl, isopropyl, 2-hydroxyethyl, cyanoethyl, and/or phenyl radicals and the ones of this sub-group which have the most hypotensive activity in normo-tensive rats are the ones having the methyl, ethyl, isopropyl, and 2-hydroxyethyl radicals. The sub-group of meta nitro-benzamides which showed the most reduction in spontaneous activity in mice are those having methyl, 2-hydroxyethyl, phenyl, and 2-hydroxyphenethyl radicals. Still another sub-group may include both the para and meta-nitro-benzamides having the most reduction in spontaneous activity in mice which contain the methyl, 2-hydroxyethyl, and phenyl radicals.

(B) Their preparation

The new compounds according to this invention were prepared by the following equation:

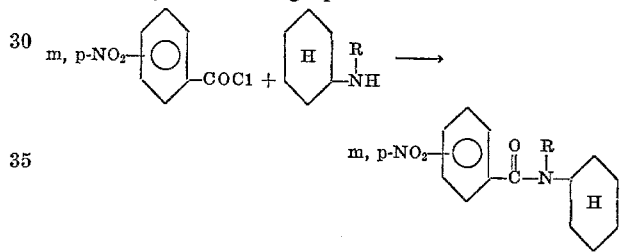

Herein equimolar amounts of the nitrobenzoyl halide were reacted with a well stirred solution of N-substituted-cycloalkylamine in triethylamine and dimethylacetamide at a temperature between about 0° and 10° C. When the addition of the nitrobenzoyl halide solution was completed, the crude substituted benzamide was precipitated by the addition of cold water and collected. This crude product was crystallized from aqueous ethanol to give the pure new compounds of this invention, which were tested for composition and physical properties. The results of some of these tests on the preferred N-substituted-N'-cyclohexyl- m, p-nitrobenzamides are shown in the following Table I:

TABLE I.—SUBSTITUTED NITROBENZAMIDES

| Example number | NO₂ position | N—R | Yield, percent | M.P., °C. | Calculated C | Calculated H | Found C | Found H |
|---|---|---|---|---|---|---|---|---|
| 1 | p— | —CH₃ | 76.5 | 102.5 | 64.11 | 6.92 | 64.40 | 6.95 |
| 2 | m— | —CH₃ | 72.2 | 94.5 | 64.11 | 6.92 | 64.35 | 6.91 |
| 3 | p— | —C₂H₅ | 70.5 | 72.3 | 65.44 | 6.96 | 65.40 | 6.97 |
| 4 | m— | —C₂H₅ | 72.3 | 45.0 | 65.44 | 6.96 | 65.46 | 6.94 |
| 5 | p— | —CH(CH₃)₂ | 69.5 | 107.8 | 66.18 | 7.64 | 65.99 | 7.67 |
| 6 | m— | —CH(CH₃)₂ | 74.8 | 35.6 | 66.18 | 7.64 | 66.10 | 7.61 |
| 7 | p— | —CH₂CH₂—OH | 75.0 | 210.5 | 61.63 | 6.90 | 61.59 | 6.93 |
| 8 | m— | —CH₂CH₂—OH | 74.2 | ᵃ Oil | 61.63 | 6.90 | 61.66 | 6.91 |
| 9 | p— | —CH₂CH₂CN | 72.5 | 120.1 | 63.77 | 6.35 | 63.82 | 6.30 |
| 10 | m— | —CH₂CH₂CN | 69.6 | 93.1 | 63.77 | 6.35 | 63.90 | 6.38 |
| 11 | p— | C₆H₅ | 71.3 | 132.4 | 70.37 | 6.21 | 70.39 | 6.20 |
| 12 | m— | C₆H₅ | 75.0 | 105.1 | 70.37 | 6.21 | 70.31 | 6.19 |
| 13 | p— | —CH₂—CH—OH (with phenyl) | 65.8 | 126.1 | 68.46 | 6.57 | 68.40 | 6.55 |
| 14 | m— | Same as above | 66.9 | 25.2 | 68.46 | 6.57 | 68.55 | 6.60 |

ᵃ Purified by chromatography (eluted by petroleum ether) on silica gel.

(C) Their pharmacology

The activity of these new compounds was tested by dissolving them in propylene glycol and administering their resulting solutions orally and intraperitoneally into small animals such as rats and mice in dosages of one, three, five and seven milligrams per kilogram of weight of the animal administered. The depressant effect of the new compounds was determined in C3H mice weighing between 20 and 25 grams with actophotometers which measure the total movements of a single animal each fifteen minute interval over a one hour period, and the mean count for each period for eight animals for each compound was recorded. Eight additional mice were administered the same amounts of chlorpromazine, a well known CNS depressant (tranquilizer), and the results obtained are listed in the following table which shows most of these new compounds to be more active than chlorpromazine at least in some dosages, and usually the substituted para-nitrobenzamides to be the most active.

TABLE II.—EFFECTS ON THE SPONTANEOUS ACTIVITY IN MICE

|  | Dose, mg./kg. | Percent reduction in spontaneous activity |
|---|---|---|
| Chlorpromazine | 1.0 | 2.5 |
|  | 3.0 | 42.4 |
|  | 5.0 | 60.0 |
|  | 7.0 | 75.2 |
| Compound number: |  |  |
| 1 | 1.0 | 32.4 |
|  | 3.0 | 72.0 |
|  | 5.0 | 91.1 |
|  | 7.0 |  |
| 2 | 1.0 | 23.1 |
|  | 3.0 | 62.9 |
|  | 5.0 | 80.4 |
|  | 7.0 | 95.2 |
| 3 | 1.0 | 30.8 |
|  | 3.0 | 66.4 |
|  | 5.0 | 86.0 |
|  | 7.0 |  |
| 4 | 1.0 | 4.5 |
|  | 3.0 | 44.1 |
|  | 5.0 | 61.9 |
|  | 7.0 | 76.5 |
| 5 | 1.0 | 32.0 |
|  | 3.0 | 73.9 |
|  | 5.0 | 93.4 |
|  | 7.0 |  |
| 6 | 1.0 | 0.5 |
|  | 3.0 | 39.0 |
|  | 5.0 | 57.2 |
|  | 7.0 | 72.0 |
| 7 | 1.0 | 32.5 |
|  | 3.0 | 71.8 |
|  | 5.0 | 89.6 |
|  | 7.0 |  |
| 8 | 1.0 | 18.5 |
|  | 3.0 | 57.6 |
|  | 5.0 | 75.8 |
|  | 7.0 | 90.4 |
| 9 | 1.0 | 18.5 |
|  | 3.0 | 58.4 |
|  | 5.0 | 76.0 |
|  | 700 | 91.0 |
| 10 | 1.0 | 6.0 |
|  | 3.0 | 45.2 |
|  | 5.0 | 63.1 |
|  | 7.0 | 76.8 |
| 11 | 1.0 | 18.8 |
|  | 3.0 | 58.1 |
|  | 5.0 | 76.5 |
|  | 7.0 | 90.9 |
| 12 | 1.0 | 20.2 |
|  | 3.0 | 60.0 |
|  | 5.0 | 77.4 |
|  | 7.0 | 92.5 |
| 13 | 1.0 |  |
|  | 3.0 | 36.1 |
|  | 5.0 | 54.2 |
|  | 7.0 | 69.0 |
| 14 | 1.0 | 23.8 |
|  | 3.0 | 63.4 |
|  | 5.0 | 80.4 |
|  | 7.0 | 95.2 |

Indirect blood pressure measurements were conducted in normotensive Wistar rats by injecting 5 mg./kg. intraperitoneally, and the systolic blood pressure was determined by using a photoelectric tensometer. The mean response of eight test animals and eight control animals was used to determine the percent reduction in blood pressure produced by each tested compound. The results of these pharmacological tests for compounds 1, 3, 5 and 7 listed in Table I above are shown in the following Table III:

TABLE III.—HYPOTENSIVE ACTIVITY IN NORMOTENSIVE RATS

| Minutes following administration | Percent reduction of control blood pressure | | | | |
|---|---|---|---|---|---|
|  | 15 | 30 | 60 | 90 | 120 |
| Compound number: |  |  |  |  |  |
| 1 | 50.0 | 28.6 | 20.5 | 15.0 | 0.0 |
| 3 | 49.4 | 32.0 | 22.6 | 14.2 | 2.5 |
| 5 | 50.4 | 31.6 | 20.8 | 12.5 | 3.1 |
| 7 | 48.3 | 30.2 | 20.0 | 5.1 | 0.0 |

DETAILED DESCRIPTION OF SOME PREFERRED EMBODIMENTS

Example 1

N-methyl-N'-cyclohexyl-p-nitrobenzamide was prepared by adding a mixture of 25 milliliters of dimethylacetamide, 0.01 mole of p-nitrobenzoyl chloride to a cooled solution (ice bath) containing 0.01 mole of N-methylcyclohexylamine, 25 milliliters of dimethylacetamide and 0.01 mole of triethylamine. When the addition of the p-nitrobenzoyl chloride solution was completed the crude N-methyl-N'-cyclohexyl-p-nitrobenzamide was precipitated by the addition of cold water and collected. This crude product was recrystallized from aqueous ethanol to form the pure nitrobenzamide of this example.

This new compound was then tested according to the Table I above in which the carbon and hydrogen content were obtained with a Coleman Carbon-Hydrogen analyzer. The melting point was determined by using a Mettler FP-1 melting and boiling point apparatus. The infrared absorption spectrum was obtained with a Perkin-Elmer Model 137-B spectrophotometer.

The oral administration of one, three, five and seven milligrams per kilogram of this compound dissolved in propylene glycol resulted in a significant reduction in the spontaneous motor activity of the mice (see Table II above), and also a reduction in the blood pressure (see Table III above).

Example 2

N-methyl-N'-cyclohexyl-m-nitrobenzamide was prepared from m-nitrobenzoyl chloride and N-methylcyclohexylamine in the same manner as that employed in Example 1 above. The resulting compound was also tested as described in Example 1 above, and as shown in Tables I, II above.

Example 3

N-ethyl-N'-cyclohexyl-p-nitrobenzamide also was produced in the same manner described in Example 1 above. This new compound was similarly tested as described above and as shown in Tables I, II, and III. It was shown to have both CNS depressant and blood pressure depressor activity in dosages of 5 mg./kg. and its blood pressure activity had a relative long duration.

Example 4

N-ethyl-N'-cyclohexyl-m-nitrobenzamide was also produced according to the process described for Example 1 above and similarly tested as shown in Tables I and II. Intraperitoneal doses of this compound of five milligrams per kilogram in propylene glycol produced a high degree of depressant activity as shown in Table II.

Example 5

N-isopropyl-N'-cyclohexyl-p-nitrobenzamide was produced similar to the process described in Example ), and it had pharmocological effects similar to those for the compound of Example 3 as shown in Tables II and III. This compound had the greatest CNS depressant action, and its blood pressure depressor action had the fastest onset.

Example 6

N-isopropyl-N'-cyclohexyl-m-nitrobenzamide was produced according to the process described for Example 1 and was tested to have depressant properties about the same as chlorpromazine.

Example 7

N-2-hydroxyethyl-N'-cyclohexyl-p-nitrobenzamide was produced according to the process described for Example 1 and was tested to have properties as shown in Tables I, II and III.

Example 8

N-2-hydroxyethyl-N'-cyclohexyl-m-nitrobenzamide was produced according to the process described for Example 1 and was tested to have properties as shown in Tables I and II.

Example 9

N - 2 - cyanoethyl-N'-cyclohexyl-p-nitrobenzamide was produced according to the process described for Example 1 and was tested to have properties as shown in Tables I and II.

Example 10

N - 2 - cyanoethyl-N'-cyclohexyl-m-nitrobenzamide was produced according to the process described for Example 1 and was tested to have properties as shown in Tables I and II.

Example 11

N-phenyl - N' - cyclohexyl-p-nitrobenzamide was produced according to the process described for Example 1 and was tested to have properties as shown in Tables I and II.

Example 12

N-phenyl - N' - cyclohexyl-m-nitrobenzamide was produced according to the process described for Example 1 and was tested to have properties as shown in Tables I and 11.

Example 13

N-2-hydroxyphenethyl-N'-cyclohexyl-p-nitrobenzamide was produced according to the process described for Example 1 and was tested to have properties as shown in Tables I and II.

Example 14

N - 2 - hydroxyphenethyl-N'-cyclohexyl-m-nitrobenzamide was produced according to the process described for Example 1 and was tested to have properties as shown in Tables I and II.

While there is described above the observed principles of this invention in connection with a specific group of compounds, it is to be clearly understood that there may be many unobserved additional effects which could contribute substantially to the effectiveness of these compounds, and that the foregoing description is made only by way of example and not as a limitation to the scope of these compounds.

What is claimed is:

1. A compound of the formula

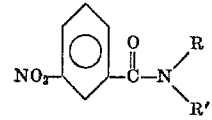

wherein R is selected from the group consisting of alkyl having one, two and three carbon atoms, 2-hydroxyethyl, phenyl, and 2-hydroxyphenethyl radicals, and R' is selected from the group consisting of cycloalkyl radicals containing between three and seven carbon atoms.

2. A compound according to claim 1 wherein said R' is a cyclohexyl radical.

3. A compound according to claim 1 wherein R is a methyl radical.

4. A compound according to claim 1 wherein R is a phenyl radical.

5. A compound according to claim 1 wherein R is a 2-hydroxyethyl radical.

6. N-methyl-N'-cyclohexyl-m-nitrobenzamide.
7. N-hydroxyethyl-N'-cyclohexyl-m-nitrobenzamide.
8. N-phenyl-N'-cyclohexyl-m-nitrobenzamide.
9. N - 2 - hydroxyphenethyl-N'-cyclohexyl-m-nitrobenzamide.

References Cited

UNITED STATES PATENTS 2,442,797   6/1948   Cope _____ 260—477

FOREIGN PATENTS 1,520,925   3/1968   France _____ 260—465

OTHER REFERENCES

R. Kalischer et al., Chem. Abstracts, vol. 27, p. 996 (1933).

S. Winternitz et al., Chem. Abstracts, vol. 47, col. 12269 (1953).

T. Hancock et al., J. Amer. Chem. Soc., vol. 66, pp. 1738–47, (10/1944).

HARRY I. MOATZ, Primary Examiner

U.S. Cl. X.R.

424—324; 260—465 D, 558 P

PO-1050
(5/69)

UNITED STATES PATENT OFFICE
CERTIFICATE OF CORRECTION

Patent No. 3,751,464     Dated August 7, 1973

Inventor(s) William D. ROLL

It is certified that error appears in the above-identified patent and that said Letters Patent are hereby corrected as shown below:

Column 4, line 75, change close parenthesis mark ")" to -- 3 --

Signed and sealed this 5th day of March 1974.

(SEAL)
Attest:

EDWARD M. FLETCHER, JR.
Attesting Officer

C. MARSHALL DANN
Commissioner of Patents